United States Patent
Cai et al.

[11] Patent Number: 5,848,160
[45] Date of Patent: *Dec. 8, 1998

[54] DIGITAL SYNTHESIZED WIDEBAND NOISE-LIKE WAVEFORM

[75] Inventors: Khiem V. Cai, Brea; Roger J. O'Connor, Dove Canyon, both of Calif.

[73] Assignee: Raytheon Company, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 603,673

[22] Filed: Feb. 20, 1996

[51] Int. Cl.$^6$ ................. H04L 9/04; H04L 9/00
[52] U.S. Cl. ................. 380/44; 380/46; 380/47
[58] Field of Search ................. 380/44, 46, 47; 364/717

[56] References Cited

U.S. PATENT DOCUMENTS

| | | | |
|---|---|---|---|
| 4,308,617 | 12/1981 | German, Jr. | 375/1 |
| 4,658,436 | 4/1987 | Hill | 380/31 |
| 4,853,884 | 8/1989 | Brown et al. | 364/602 |
| 5,007,087 | 4/1991 | Bernstein et al. | 380/46 |
| 5,251,165 | 10/1993 | James, III | 364/717 |
| 5,381,481 | 1/1995 | Gammie et al. | 380/49 |
| 5,471,187 | 11/1995 | Hansen | 340/146.2 |
| 5,596,570 | 1/1997 | Soliman | 370/252 |

*Primary Examiner*—Thomas H. Tarcza
*Assistant Examiner*—Carmen D. White
*Attorney, Agent, or Firm*—Leonard A. Alkov; William C. Schubert; Glenn H. Lenzen, Jr.

[57] ABSTRACT

Apparatus and a method for generating a digital synthesized Gaussian noise-like waveform that may be used to modulate and demodulate communication data. The present invention uses a seed input that addresses a read only memory look-up table, for example, containing digital samples having Gaussian statistics. A sequence generator generates a pair of pseudo-random sequences in response to the seed input that address the read only memory to look up and output a pair of pseudo-random Gaussian samples that are used to generate the Gaussian noise-like waveform. A processor converts the pair of pseudo-random Gaussian samples into corresponding analog I and Q signals, and a modulator 33 modulates the analog I and Q signals to generate a modulated output signal having the Gaussian noise-like waveform.

7 Claims, 3 Drawing Sheets

DIGITAL SYNTHESIZED WIDEBAND NOISE-LIKE WAVEFORM

BACKGROUND

The present invention relates generally to electronic noise generators, and more particularly, to an electronic noise generator whose properties are precisely controllable so that the resulting waveform is predictable once a set of initial states have been established.

DSPN spread spectrum communications systems generally provides for robust communication because the energy of the waveform is spread over a relatively large RF bandwidth, thus reducing its delectability by intercept receivers. However DSPN spread spectrum waveforms have various characteristics that are vulnerable to intercept receivers. A sophisticated intercept receiver can perform nonlinear processing and detect the carrier frequency and/or the spreading chip rate. However if the waveform is Gaussian, then the baud rate and the carrier frequency features are not detectable by a nonlinear intercept receiver.

The synthesis challenge that is addressed by the present invention is to produce a digitally controlled noise waveform, that is roughly Gaussian in its in-phase and quadrature (I and Q) components, similar to thermal noise, thus providing for a noise waveform that is not detectable. There are many applications for a noise generator that produces this type of waveform, and one is the generation of over-the-air waveforms for communications systems.

Accordingly, it is an objective of the present invention to provide for an electronic noise generator having a precisely controlled and predictable waveform that is roughly Gaussian in its in-phase and quadrature (I and Q) components.

SUMMARY OF THE INVENTION

To meet the above and other objectives, the present invention provides for a noise generator and generation method that generates a pair of random Gaussian samples, converts the samples into an analog I and Q signal, and then modulates them with a binary bit stream. The result is roughly a Gaussian signal spreading over the desired bandwidth, similar to thermal noise. The noise generator and method generates a wide bandwidth noise waveform, and a very large set of selectable waveforms may be produced. The generator may be replicated in large quantities with and each exhibits nanosecond coherent waveform matching, thus providing the ability to synchronize multiple generators by giving them a starting clock pulse at a particular instant of time.

The present invention thus produce a digitally controlled noise waveform that has Gaussian in-phase and quadrature components, which waveform is not detectable. There are many applications for noise generators that produces this type of waveform, and one is the generation of over-the-air waveforms for communications systems. In addition to communication applications, the present invention may also be used in radar applications such as low probability of intercept radars and sonar or undersea communication applications.

More specifically, the present invention provides for apparatus and a method for generating a digital synthesized Gaussian noise-like waveform that may be used to modulate and demodulate communication data. The present invention uses a seed input that addresses a read only memory look-up table, for example, containing digital samples having Gaussian statistics. A sequence generator generates a pair of pseudo-random sequences in response to the seed input that address the read only memory to look up and output a pair of pseudo-random Gaussian samples that are used to generate the Gaussian noise-like waveform. A processor converts the pair of pseudo-random Gaussian samples into corresponding analog I and Q signals, and a modulator modulates the analog I and Q signals to generate a modulated output signal having the Gaussian noise-like waveform.

True random Gaussian noise can be generated for communication applications, but it cannot be replicated, and thus have limited application for coherent communications. The digitized synthesized wideband noise-like waveform produced by the present invention is roughly a white Gaussian waveform, similar to thermal noise, and therefore it is less vulnerable to a nonlinear receiver. Furthermore, the waveform is generated digitally, and thus may be recreated given a set of initial states.

Nonlinear detection receivers that search for the receiver carrier frequency and the baud rate characteristics of existing communication waveforms are currently in existence. The present digitized synthesized wideband noise-like waveform is a communication waveform that has no features, and thus cannot be intercepted by a nonlinear receiver.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

The present invention synthesizes a spread spectrum waveform that is roughly Gaussian and that is reproducible with given authorized key initial states. The present invention provides for apparatus and a method of generating a digital synthesized Gaussian noise-like waveform that may be used to modulate and demodulate communication data, and that maintains high communication efficiency as a DSPN waveform.

Figure 1:
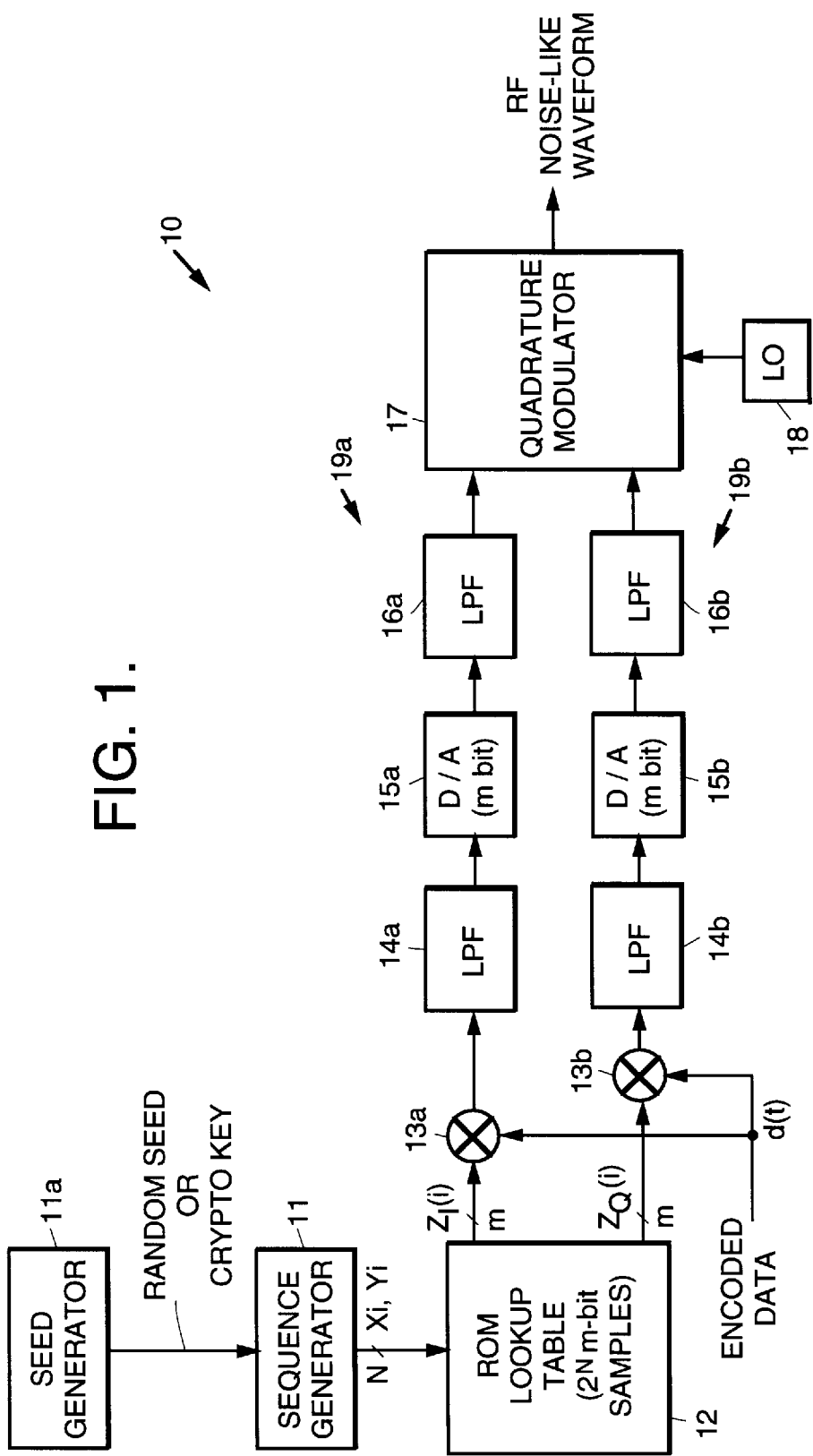
FIG. 1 illustrates a block diagram of a digital synthesized Gaussian noise-like waveform transmitter in accordance with the principles of the present invention.

Referring to the drawing figures, FIG. 1 illustrates a block diagram of a digital synthesized Gaussian noise-like waveform transmitter 10 in accordance with the principles of the present invention. Digital samples having Gaussian statistics are generated and stored in a read only memory (ROM) look-up table 12. A pair of pseudo-random sequences is generated using a sequence generator 11 based on a preselected seed or cryptographic key (crypto key) derived from a seed generator 11 a, and output bit streams from the sequence generator 11 are then used to extract (look up) pairs or random sequences of random Gaussian samples in the look-up table 12. These sequences are then converted into analog I and Q signals using parallel I and Q processing channels 19a, 19b, that are used to modulate a data bit stream (encoded data). Each processing channel 19a, 19b includes a mixer 13a, 13b, an optional low pass filter (LPF) 14a, 14b, an m-bit digital-to-analog (D/A) converter 15a, 15b, and an analog low pass filter 16a, 16b. Outputs of the analog low pass filter 16a, 16b are modulated, such as by using a quadrature modulator 17, for example, and converted to an RF modulated signal using a local oscillator (LO) 18 in conjunction with the modulator 17. The result is roughly a Gaussian output signal (RF noise-like waveform) that spreads over a bandwidth roughly equal to the Gaussian sample rate.

Without the knowledge of ROM look-up table 12, the structure of the sequence generator 11 or its initial states, the digital synthesized Gaussian noise-like waveform looks like thermal noise. It has no distinguished features, and is not reproducible. This waveform is not detectable by nonlinear receivers such as baud rate detectors or frequency doubling or quadrupling detectors, for example.

During operation of the digital synthesized Gaussian noise-like waveform transmitter 10 shown in FIG. 1, the sequence generator 11 generates an independent random bit stream. Two symbols $X_i$ and $Y_i$ of length N, are selected from the output of the sequence generator 11, and are used as addresses to select two Gaussian samples, $Z_I(i)$ and $Z_Q(i)$, from the ROM lookup table 12. The ROM lookup table 12 is comprised of $2^N$ samples having Gaussian statistics. That is, each symbol of N bits addresses a stored Gaussian number in the ROM lookup table 12. Each entry in the ROM lookup table 12 is an m-bit number.

Since the output of a sequence generator 11 is random, and the positions of the samples in the ROM lookup table 12 are random, the two Gaussian samples are practically independent. The pair of random Gaussian samples are separately modulated with the encoded data bit stream (encoded data), and converted into analog I and Q signals by two independent m-bit digital-to-analog (D/A) converters 15a, 15b. The I and Q signals are then modulated using the quadrature modulator 17 and are converted to an RF waveform using local oscillator (LO) 18. The resulting waveform is roughly a Gaussian signal spreading over a desired bandwidth, similar to thermal noise.

The sequence generator 11 is used to generate an independent random bit stream. The sequence venerator 11 may be a linear sequence generator based on an m-sequence or a TRANSEC-type device that transmits a secured bit stream. Two symbols $X_i$ and $Y_i$, each of N bits, are selected from the output of the sequence generator 11 at the rate equal to the desired bandwidth. These two symbols can be assumed to be independent, and uniformly distributed over the range [000 . . . 00, 111 . . . 11]. In practice, the sequence generator 11 can be designed so that the symbols are unpredictable and the repetition period is long enough to avoid detection.

Since there are two symbols selected at the rate equal to the bandwidth, the sequence generator 11 must run at the rate equal to twice the bandwidth or two sequence generators 11 must be used that run at a rate equal to the bandwidth are used. Because the sequence generator 11 can output at a samples rate exceeding hundred megasamples per second, the signal can have a very wide bandwidth.

Gaussian noise may be generated by a thermal noise source, for example, but it has little use in communication systems that require coherent operation of multiple noise sources, because an exact replica cannot be generated both at the transmitter 10 and receiver 21. However, in the present invention, Gaussian noise is generated in real time by computation. The random noise generator 11 is used to generate two random samples $X_i$, $Y_i$ with uniform distribution between [0,1]. These two variable $X_i$, $Y_i$ are converted to a pair of I and Q Gaussian samples using the equations:

$$I(i)=m+\sigma[-2*\ln(X_i)]^{1/2}\cos(2\pi Y_i)$$

$$Q(i)=m+\sigma[-2*\ln(X_i)]^{1/2}\sin(2\pi Y_i)$$

where m and $\sigma$ are the mean and standard deviation of the Gaussian signal, $X_i$ and $Y_i$ are random variables, uniformly distributed with [0,1]. This process directly converts two uniformly distributed samples into two Gaussian samples I(i) and Q(i). For covert communications, the same seeding is used at the transmitter 10 and receiver 21 to obtain the two identical digital synthesized Gaussian noise-like waveforms. However the computation time required to obtain I(i) and Q(i) must be shorter than the sample duration; thus this technique is not useful for high bandwidth spread spectrum systems. To overcome these limitations, the ROM lookup table 12 is used to simplify generation of the digitally synthesized Gaussian noise-like waveform.

Analog Gaussian noise is generated or collected. The noise is then sampled, digitized (truncated to m bits) and randomly stored in the ROM lookup table 12 for use. Random addresses X(i) and Y(i) are used to select independent samples $Z_I(i)$ and $Z_Q(i)$ which have Gaussian statistics. For covert communication, the ROM table lookup 12 having $2^N$ samples, each with m bits, must be made available at both the transmitter 10 and receiver 21 to allow despreading of the digital synthesized Gaussian noise-like waveform.

The seed value is made available at both transmitter 10 and receiver 21, so that tables of $2_N$ samples of random samples may be generated. Pairs of such random samples are then used to generate Gaussian samples using the following equations:

$$G_i=m+\sigma[-2*\ln(U_i)]^{1/2}\cos(2\pi U_{i+1})$$

$$G_{i+1}=m+\sigma[-2*\ln(U_i)]^{1/2}\sin(2\pi U_{i+1})$$

where m and $\sigma$ are the mean and standard deviation of the Gaussian signal, $U_i$ and $U_{i+1}$, are random variables, uniformly distributed with [0,1]. The Gaussian samples {Gi} are then truncated to m bits and randomly stored in the ROM for use. Thus, the ROM table lookup 12 has $2^N$ m-bit samples that have a Gaussian distribution.

Since the inputs to the ROM lookup table 12 ($X_i$ and $Y_i$) are random, and the positions of the Gaussian samples in the ROM lookup table 12 are random, the two random samples $Z_I(i)$ and $Z_Q(i)$ are the independent Gaussian processes that are noise-like, and have no features that are distinguishable from true noise samples. Furthermore more, a very large set of selectable waveforms to choose from may be generated and stored in the ROM lookup table 12, or may be changed as needed to avoid detection.

In addition, the noise that is generated in this manner is not limited to Gaussian noise. Other noise forms such as Laplacian or log-normal noise can be collected or generated and stored for use as desired.

The I and Q Gaussian samples are modulated by a data signal d(t). The resulting signal is then filtered and interpolated to shape the signal spectrum and obtain the signal samples at a higher sampling rate, such as 4 times the rate of $Z_I(i)$ and $Z_Q(i)$ as shown in the embodiment of FIG. 1. The filters 14a, 14b are optional and are used to shape the waveform spectrum, and relax the analog filters 16a, 16b that follow. The filtered signals are then converted to the analog signal with two m-bit D/A converters 15a, 15b and filtered with the two analog lowpass filters 16a, 16b to remove harmonic and unwanted spectral contents. After filtering, the I and Q signals are quadrature modulated using the quadrature modulator 17 to an IF frequency and combined with the output signal from the local oscillator 18 to provide a Gaussian IF signal. This signal has roughly a Rayleigh amplitude distribution and random phase. The Gaussian IF signal may be then RF modulated and transmitted using a linear power amplifier (not shown).

Complementary communication is achieved between transmitters 10 and receivers 21 employing the present invention because the structure of the sequence generator 11 is defined, the initial states for the sequence generator 11 and the procedure for generating the samples stored in the ROM look-up table 12 are known at any authorized unit. A complementary receiver 21 (FIG. 2) that has the required seed or cryptographic key for its sequence generator 11, and has a similar Gaussian ROM look-up table 12 can duplicate the waveform generation process to produce the identical Gaussian waveform, which can be used to demodulate the Gaussian output signal from the transmitter 10. This receiver 21 and its demodulator 20 are shown and discussed with reference to FIG. 2.

Figure 2:
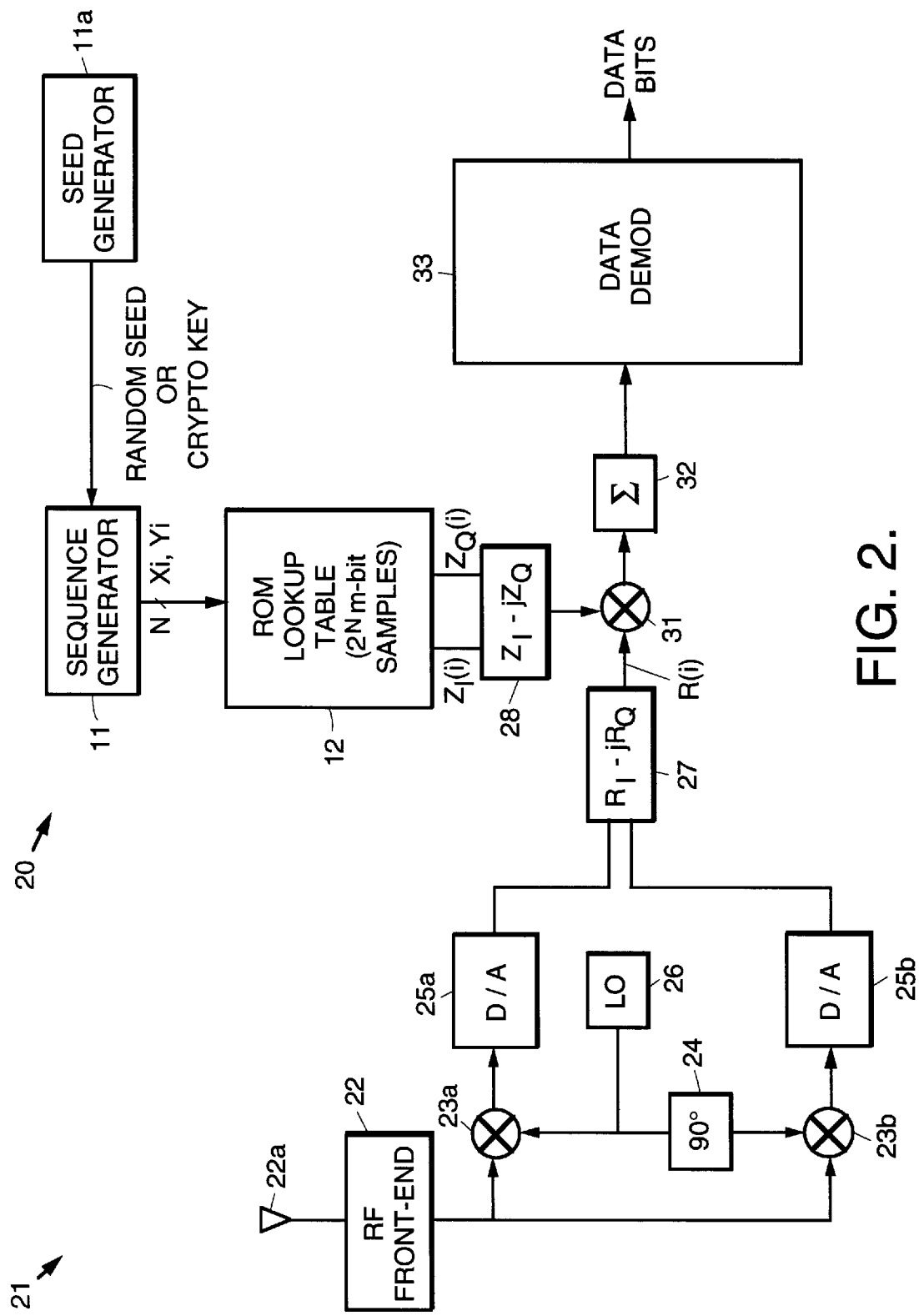
FIG. 2 illustrates a block diagram of a digital synthesized Gaussian noise-like waveform demodulator in accordance with the principles of the present invention.

The digital synthesized Gaussian noise-like waveform may be decoded in a similar manner as a conventional DSPN waveform. FIG. 2 shows a block diagram of a digital synthesized Gaussian noise-like waveform demodulator 20 that is used in the receiver 21. A typical receiver 21 includes a front-end receiver 22 that includes an antenna 22a, a local oscillator 26, a 90 degree hybrid 24, two mixers 23a, 23b, two digital to analog converters 25a, 25b, and a summing device 27. The received signal, after being processed by the front-end receiver 22, is converted into the baseband I and Q signals. The I and Q signals are then converted into digital samples $R_I(i)$ and $R_Q(i)$ samples, which form a complex baseband signal R(i) given by:

$$R(i) = R_I(i) + jR_Q(i).$$

Digital synthesized Gaussian noise-like waveform samples are also generated by the sequence generator 11 and ROM lookup table 12, and are used as a reference signal. The I and Q samples of the reference signal are converted to a complex (conjugate) signal in a summing device 28 in accordance with the equation:

$$Z(i) = Z_I(i) + jZ_Q(i).$$

In the absence of noise, frequency offset and time offset, the received baseband signal is equal to the complex conjugate of the reference signal. Thus a matched filter receiver 21 is formed by using a multiplier 31 to multiply the received signal with the reference signal and integrating over the bit time using a summing device 32 that implements the equation:

$$d_r(t) = \sum_{i=1}^{L} R(i) \cdot Z(i)$$

where d(t) is the demodulated data and L is the number of samples per bit. Thus a maximum signal to noise ratio may be achieved to yield optimum performance of the demodulator 20. This signal is then demodulated by the data demodulator 33 to produce data bits.

Figure 3:
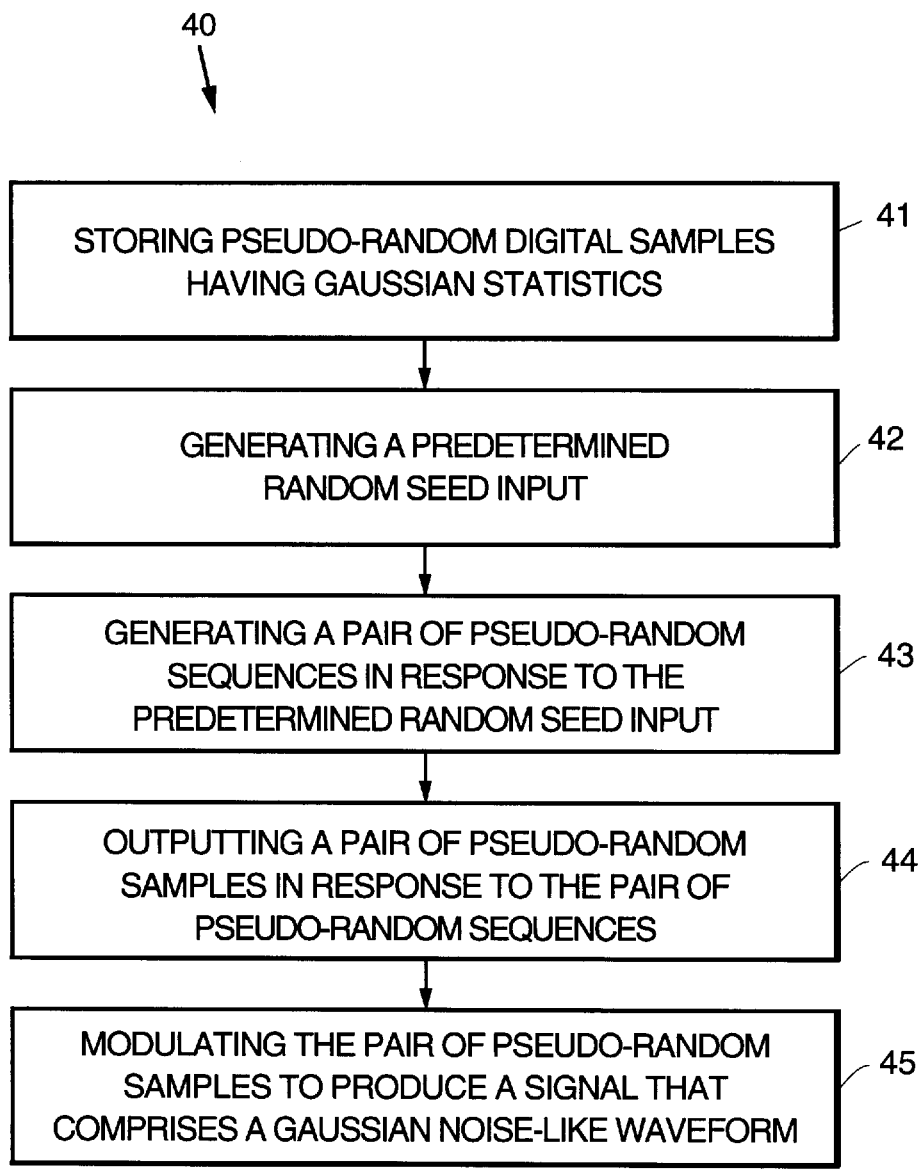
FIG. 3 is a flow diagram illustrating one method in accordance with the principles of the present invention.

For the purposes of completeness, FIG. 3 is a flow diagram illustrating one method 40 in accordance with the principles of the present invention. The method 40 generates a digital synthesized Gaussian noise-like waveform that may be used to modulate and demodulate communication data. The method 40 comprises the following steps. Pseudo-random digital samples having Gaussian statistics are stored 41. A predetermined random seed input is generated 42. A pair of pseudo-random sequences are generated 43 in response to the predetermined random seed input. A pair of pseudo-random samples are output 44 in response to the pair of pseudo-random sequences. The pair of pseudo-random samples are then modulated 45 to produce a signal that comprises a Gaussian noise-like waveform.

Thus, an electronic noise generator and noise generation method having a precisely controlled and predictable waveform has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Apparatus for generating a digitally synthesized noise-like waveform that may be used to modulate and demodulate communication data, said apparatus comprising:

a seed generator for generating a predetermined random seed input;

a read only memory look-up table comprising pseudo-random digital samples having predetermined statistics;

a sequence generator coupled between the seed generator and the read only memory look-up table for generating a pair of pseudo-random sequences in response to the predetermined seed input that address the read only memory look-up table and output a pair of pseudo-random samples;

processing means coupled to the read only memory look-up table for combining the pair of pseudo-random samples with communication data to generate a spread spectrum waveform; and modulation means coupled to the processing means for processing the spread spectrum waveform to generate a modulated output signal having a digitally synthesized noise-like waveform.

2. The apparatus of claim 1 wherein the processing means comprises:

first and second processing channels that respectively comprise:
a mixer;
an m-bit digital-to-analog converter; and
an analog low pass filter.

3. The apparatus of claime 2 wherein the first and second processing channels each further comprise a low pass filter.

4. The apparatus of claim 2 wherein the seed generator comprises means for generating a cryptographic key.

5. The apparatus of claim 1 further comprising:

a quadrature modulator and a local oscillator for quadrature modulating the spread spectrum waveform to generate the modulated output signal having the digitally synthesized noise-like waveform.

6. A method for generating a digitally synthesized noise-like waveform, said method comprising the steps of:

storing pseudo-random digital samples having predetermined statistics;

generating a predetermined random seed input;

generating a pair of pseudo-random sequences in response to the predetermined random seed input;

outputting a pair of pseudo-random samples in response to the pair of pseudo-random sequences;

combining the pair of pseudo-random samples with communication data to generate a spread spectrum waveform;

modulating the spread spectrum waveform to generate a modulated output signal having a digitally synthesized noise-like waveform.

7. The method of claim 6 wherein the step of generating a predetermined seed input comprises generating a cryptographic key.

* * * * *